United States Patent [19]

Evans

[11] 4,201,126
[45] May 6, 1980

[54] NUT CRACKING APPARATUS

[76] Inventor: Kenneth R. Evans, 834 Runneberg Rd., Crosby, Tex. 77532

[21] Appl. No.: 962,707

[22] Filed: Nov. 21, 1978

Related U.S. Application Data

[63] Continuation-in-part of Ser. No. 796,475, May 12, 1977, abandoned.

[51] Int. Cl.² .............................................. A23N 5/00
[52] U.S. Cl. .......................................... 99/574; 99/579
[58] Field of Search ................. 99/568, 621, 574–576, 99/581–582, 609–610, 625–628; 426/482; 241/6, 7, 252; 100/158; 198/652, 655, 695

[56] References Cited

U.S. PATENT DOCUMENTS

| | | | |
|---|---|---|---|
| 1,238,238 | 8/1917 | Williams | 99/570 |
| 1,334,822 | 3/1920 | Varble | 198/654 |
| 1,342,691 | 6/1920 | Pape | 99/582 |
| 4,015,704 | 4/1977 | Warren | 198/652 |

FOREIGN PATENT DOCUMENTS

16829 of 1913 United Kingdom ..................... 99/572

*Primary Examiner*—Philip R. Coe
*Assistant Examiner*—Timothy F. Simone
*Attorney, Agent, or Firm*—Arnold, White & Durkee

[57] ABSTRACT

A transport mechanism for transporting an uncracked nut from a supply of uncracked nuts into a zone between a pair of synchronously movable surfaces which receive the uncracked nut and transfer it to a zone of reduced geometry which results in the imposition of an axial crushing force on the nut is disclosed.

14 Claims, 15 Drawing Figures

NUT CRACKING APPARATUS

This application is a C-I-P application of application U.S. Ser. No. 796,475, filed May 12, 1977, abandoned.

BACKGROUND OF THE INVENTION

This invention relates generally to a novel method and apparatus for cracking nuts. More particularly, this invention relates to a novel method and apparatus for cracking all sizes and species of nuts by the imposition of a substantially axial crushing force on the shell of the nut.

A wide variety of methods and apparatus are known in this art for removing the shell or outer skin from a nut in order to gain access to the interior of the nut to retrieve the meat or edible portion thereof. Some of the methods or apparatus are manual whereas others are automatic in operation. It is into this latter category that the method and apparatus of the present invention falls. That is, it is intended that the method and apparatus of the present invention be utilized to automatically and mechanically crack the uncracked nuts which are supplied to it.

Devices exist in the prior art which radially crush the shells of nuts; however, these devices also have the tendency to shatter the meats as well as the shells. That is, the meats of the nuts may be broken into small pieces. It is well known that whole meats have a greater commercial value than shattered meats of the same quality, and hence a significant economic incentive exists for providing whole nut meats.

In many commercial operations, it is required to sort or otherwise categorize the various sizes of nuts of a given species. One necessity for performing this categorizing operation is that known nut cracking machinery must be set to accommodate nuts of a given size with only a slight tolerance for nuts falling significantly above or below the mean size for the category. This classification for categorizing operation requires both man power and machinery both of which are relatively expensive. Moreover, this intermediate operation delays the processing and marketing of the nut meats providing for a greater opportunity for spoilage of the nuts. Many prior art devices require adjustment to accommodate relatively small changes in nut size in order to operate at satisfactory efficiency.

Other known devices utilize impact or some "hammering" impulse to shatter the shells of nuts being processed. It has been found that machinery utilizing abruptly oscillating masses require much heavier parts in their construction and require a relatively large expenditure in time and money in maintenance and replacement of parts.

Known devices impose a wide variety of forces on the nut to be cracked. For example, some known devices roll the nut while compressing it radially. Other devices impose a slicing force to an edge of the nut to gain access to the meat. It has been found that a preferred technique for cracking nuts is to impose an axial crushing force with a minimum radial component. Moreover, if this axial force is carefully modulated, i.e, if the force on the nut is removed after the shell has shattered, greater satisfactory results obtained.

While such known arrangements have exhibited at least a degree of utility in cracking nuts, room for significant improvement remains. The problems enumerated in the foregoing are not intended to be exhaustive, but rather are among many which tend to impair the effectiveness of previously known methods and apparatus for cracking nuts. Other noteworthy problems may also exist; however, those presented above should be significant to demonstrate that nut cracking methods and apparatus appearing in the prior art have not been altogether satisfactory.

OBJECTS AND SUMMARY OF A PREFERRED EMBODIMENT OF THE INVENTION

Recognizing the need for an improved method and apparatus for cracking nuts, it is, therefore, a general object of the present invention to provide a novel method and apparatus for cracking nuts which minimizes or reduces the problems of the type previously noted.

It is another object of the present invention to provide a novel method and apparatus for cracking nuts which provides an axial crushing of a nut without the imposition of significant radial forces.

It is yet another object of the present invention to provide a novel method and apparatus for cracking nuts which can accommodate substantially all species of nuts and all sizes of each species.

It is yet still another object of the present invention to provide a novel method and apparatus for cracking nuts which minimizes the impact or abrupt oscillatory motion associated with prior art devices.

It is a further object of the present invention to provide a novel method and apparatus for cracking nuts which may be completely automated and capable of relatively high speed operation.

A method and apparatus according to the presently preferred embodiment of the invention intended to substantally accomplish the foregoing objects includes a pair of opposed crushing discs, the discs being arranged to rotate at the same speed but about different axes which are angularly offset. This arrangement provides a zone or region of maximum separation of the discs and a region or zone of minimum separation of the discs. Uncracked nuts are transported from a hopper to a transfer zone lying between the zone of maximum separation and the zone of minimum separation. It will be appreciated that the transfer zone can accommodate nuts having a relatively wide range of sizes or lengths. As a result of the synchronized rotation of the discs, a nut will be frictionally held at a location between the discs in the transfer zone and carried by the discs toward the region of minimum separation whereupon a proportioned crushing force imposed axially along the nut causes the shell to shatter. The loose pieces fall by gravity into a chute where separation may be completed.

In an alternative embodiment, a pair of opposed conveyor belts having converging surfaces may be used to effect crushing of a nut or proportioned crushing of variously sized nuts.

Examples of the more important features of this invention have thus been summarized rather broadly in order that the detailed description thereof that follows may be better understood, and in order that the contribution to the art may be appreciated. There are, of course, additional features of the invention that will be described hereinafter and which will also form the subject matter of the claims appended hereto. These additional features will become apparent with reference to the following detailed description of preferred embodiments thereof in connection with the accompanying drawings, wherein like reference numerals have been applied to like elements in which:

Figure 1:
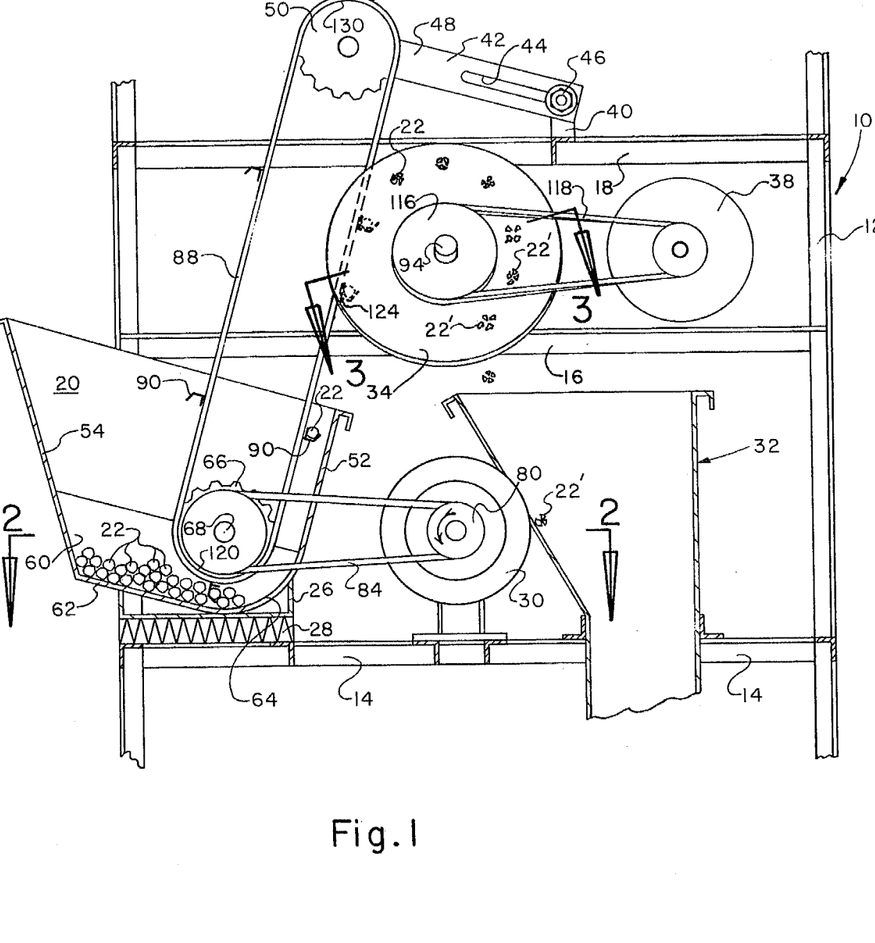
FIG. 1 is a partial sectional view of a nut cracking apparatus according to one embodiment of the present invention.
Figure 2:
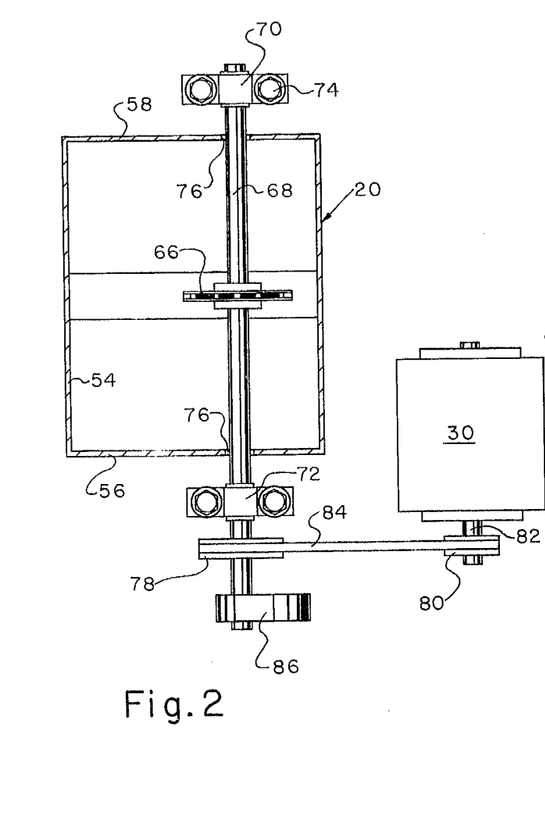
FIG. 2 is a partial sectional view taken along section lines 2—2 in FIG. 1.
Figures 3, 4, 7, 8, 9:
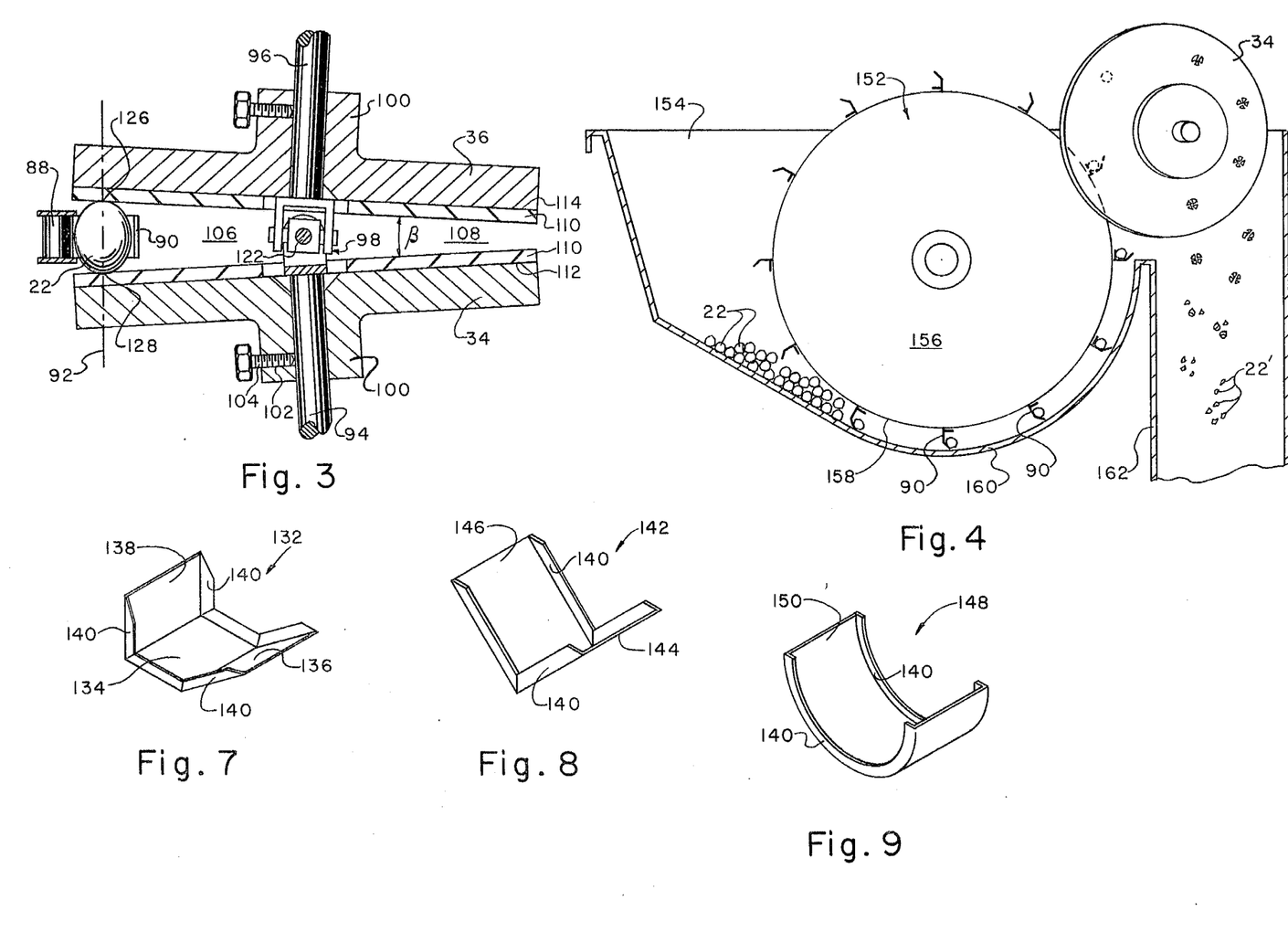
FIG. 3 is a partial sectional view of crushing discs in accordance with the present invention taken along section lines 3—3 in FIG. 1.
FIG. 4 is a partial sectional view of an alternative embodiment of a transport apparatus which may be used in connection with the apparatus of FIG. 1.
FIGS. 7-9 are pictorial representations of various receptacles which may be utilized in conjunction with the transport apparatus of the present invention.

With reference now to FIGS. 1-3, there is illustrated a nut cracking apparatus 10 in accordance with the present invention. This nut cracking apparatus 10 is mounted on a frame 12 which may be constructed of angle iron, steel or other suitable material. The frame includes a lower horizontal support 14, a middle horizontal support 16, and an upper horizontal support 18.

Mounted on the lower horizontal support 14 is a hopper or bin 20 for receiving uncracked nuts 22. This hopper 20 may be flexibly mounted by means of a base portion 26 which rests on and is attached to a flexible or resilient pad 28. This pad 28 is positioned on the lower horizontal support 14. This arrangement facilitates agitation of the uncracked nuts in the hopper 20 as will hereinafter be described. An electric transport drive motor 30 is positioned adjacent the hopper 20 on the lower horizontal support 14. A chute 32 is supported by the lower horizontal support 14. This chute 32 is operable to receive the meats and cracked shells of nuts 22' which have been cracked in accordance with the operation of the apparatus and performance of the method of this invention.

The middle horizontal support 16 provides a support platform for a pair of opposed crushing discs 34 and 36 which are mounted for rotation through the use of conventional bearings (not shown). An electric crushing disc motor 38 is positioned adjacent the crushing discs 34 and 36 to rotate the discs as will hereinafter be more fully described.

The upper horizontal support 18 provides a mounting base for a relatively stationary support post 40. An adjustment arm 42 having a longitudinal slot 44 is attached to the support post 40 by means of a bolt 46. At a remote end 48 of the adjustment arm 42 there is an idler sprocket 40 mounted for rotation by conventional means.

The hopper 20 is operable to receive a quantity of uncracked nuts 22. The hopper includes a front wall 52, a back wall 54 and opposed side walls 56 and 58. Each side wall has a lower portion 60 which is angulated towards the bottom of the hopper in order to direct nuts 22 in the hopper generally towards a bottom wall 62. The bottom wall has a curved portion 64 which facilitates transport of the uncracked nuts into the crushing discs 34 and 36.

Positioned within the hopper is a drive sprocket 66 mounted on a drive-sprocket shaft 68. This drive sprocket shaft is carried by a pair of conventional bearings 70 and 72 positioned with bolts 74 outside the hopper. An aperture 76 exists in each of the side walls 56 and 58 in order to accommodate the drive sprocket shaft 68. Each of the bearings 70 and 72 may be mounted conventionally on a support member (not shown) carried by the lower horizontal support 14.

A sprocket shaft drive wheel 78 is carried by the drive sprocket shaft 68 and corresponds to a wheel or pulley 80 mounted on a drive shaft 82 of the transport drive motor 30. A belt or chain 84 may be used to mechanically couple the sprocket shaft drive wheel 78 and the transport drive motor wheel 80.

An eccentric 86 is attached to an end of the drive sprocket shaft 68 to induce a slight vibration in the drive sprocket 66 as will hereinafter be more fully described.

A transport chain or belt 88 extends around the drive sprocket 66 and idler sprocket 50. The transport chain or belt 88 carries a series of receptacles 90 which are attached to the transport chain 88 through any suitable means. Each of the receptacles 90 is operable to pick up an uncracked nut 22 from the hopper 20 and convey it generally upwardly towards the crushing discs 34 and 36 as may be seen in FIGS. 1 and 3. These receptacles may take the form illustrated in FIGS. 7-9 or may be of any other suitable configuration to support an uncracked nut. In preferred form, however, the receptacle 90 is arranged to facilitate an alignment of the nut 22 being carried thereby to align the major axis 92 of the nut 22 perpendicular to the path of travel of the nut as the nut approaches the crushing discs 34 and 36.

The crushing discs 34 and 36 are arranged in a nonparallel fashion. That is, a first crushing disc 34 (see FIG. 3) is arranged to rotate about a first crushing disc shaft 94 and a second crushing disc 36 is arranged to rotate about a second crushing disc shaft 96, the first disc shaft 94 and the second disc shaft 96 having intersecting but angularly offset axes of rotation respectively. In preferred form, the first disc shaft 94 and the second disc shaft 96 may be coupled at the intersection of their axes by means of a conventional universal joint 98. However, it will be appreciated, that the axes need not necessarily be so coupled and may be driven independently.

The crushing discs 34 and 36 are each provided with an adjustment mechanism to control the separation of the discs. In preferred form, each crushing disc is provided with a flange 100 having a threaded aperture 102 therethrough. A set screw or bolt 104 is threaded into the aperture 102 and tightened so as to frictionally engage the respective disc shaft to thereby lock the disc on the shaft. By means of this adjustment mechanism, each crushing disc may be independently positioned on its respective disc shaft to thereby provide an adjustment in the amount of separation of the discs.

The offset axes of the crushing discs 34 and 36 defines a maximum separation zone 106 in which the crushing discs are at a maximum separation and a minimum separation zone 108 in which the crushing discs are at a minimum separation. Preferably, the maximum separation zone 106 provides a separation of the crushing discs in amount slightly in excess of twice the length of the longest nut introduced into the hopper 20 as will hereinafter be more fully explained, particularly with respect to FIG. 10. The minimum separation zone 108 preferably provides a separation which is slightly less than the length of the smallest nut in the hopper 20. In preferred form, each of the crushing discs 34 and 36 is provided with a crushing surface 110 overlying the opposed faces 112 and 114 of the crushing discs. The crushing surface 110 can be made from $\frac{1}{8}$" thick 90-durometer rubber or such similar material. In any event, the crushing surface of each disc should be of relatively high friction as will be appreciated below.

The first crushing disc shaft has a wheel or pulley 116 co-axially attached in a conventional fashion to facilitate drive by the crushing disc motor 38 which has a corresponding wheel (not shown). This drive is accomplished through a belt 118.

In the operation of the apparatus of FIGS. 1–3, uncracked nuts 22 are introduced into the hopper 20. These uncracked nuts tend to gravitate towards the curved portion 64 of the bottom wall 62 of the hopper. When the transport drive motor 30 is energized, the motor wheel 80 rotates which belt drives the drive sprocket shaft 68 which in turn causes the transport chain 88 to travel (counterclockwise) about the drive sprocket 66 and idler sprocket 50 in a well-known fashion. As each receptacle 90 passes through its perigee at 120, it will lift an uncracked nut 22 and carry it upwardly towards the crushing discs 34 and 36. It will be appreciated that the drive sprocket 66 and idler sprocket 50 are positioned in such a manner that a portion of the transport chain 88 lies intermediate and approximately midway between the crushing discs 34 and 36 in a transfer zone 107 (see FIG. 10). Moreover, it will be appreciated that the adjustment arm 42 may be arranged to position the transport chain 88 further towards or away from the intersection 122 of the axes of rotation of the crushing discs. The relative placement of the transport chain 88 in relation to the intersection 122 of the axes, the minimum separation zone 108, and the maximum separation zone 106 is believed to provide a significantly improved range of nut sizes which may be cracked without adjusting the apparatus of the present invention.

As the transport chain 88 carries an uncracked nut in a receptacle 90 towards the transfer zone 107, the nut 22 will pass into the space between the crushing discs 34 and 36 at a point 124 (FIG. 1) which point is preferably approximately half the maximum separation of the crushing discs 34 and 36. As the nut is carried further along by the transport chain, the ends 126 and 128 (FIG. 3) of the nut will come into contact with the crushing surfaces 110 of the crushing discs. The continued movement of the receptacle 90 will tend to wedge the nut 22 between the slightly resilient and high friction crushing surfaces 110 of the crushing discs 34 and 36. It will be appreciated that the length of a nut will determine at what location on the crushing discs both ends of the nut contact the crushing discs to cause the nut to become wedged between the discs. Clearly, the larger a nut, the sooner after entering the interspace between the discs that nut will become wedged between the discs.

The crushing discs are rotated by the crushing disc motor 38 by means of the drive belt 118. The speed of drive of the crushing discs 34 and 36 is such that when a nut is wedged between the crushing surfaces 110 as a result of the upward motion of the receptacle 90, the nut is effectively lifted out of the receptacle 90 and transferred to the space between crushing discs. That is, the slightly resilient crushing surfaces 110 of the crushing discs 34 and 36 frictionally engage the nut, and because the crushing discs are synchronously rotated at the same angular speed, the nut 22 is transported generally towards the minimum separation zone 108 as shown in FIG. 3.

Because the distance between the crushing surfaces 110 which hold the nut is gradually reduced as the discs 34 and 36 rotate, at some point in the travel of the nut towards the minimum separation zone, the pressure applied axially to the nut by the crushing surfaces will shatter the shell of the nut, and the loose pieces 22' will gravitate into the chute 32 which directs the pieces to a location where the meats can be separated from the shell. The duration of the axial crushing forces imposed by the discs 34 and 36 is proportioned to the relative size of a nut being cracked, as will hereinafter be more fully explained.

In the rare case a nut is too small to contact the crushing surfaces 110 as the transport chain 88 advances the receptacle 90 through the transfer one 107, the nut 22 will ride the receptacle through the apogee at 130 of the receptacle and fall once again into the hopper 20.

If nuts of, say, a relatively small size are introduced into the hopper, adjustments may be made in two respects to facilitate satisfactory cracking of the smaller sized nuts. Firstly, the first and second crushing discs 34 and 36 may be moved towards each other by unscrewing the set screw 104, repositioning these discs respectively, and retightening the set screw. Secondly, or alternatively, the adjustment arm 42 may be repositioned with respect to the support post 40 to bring the transport chain 88 closer to the minimum separation zone 108. It will be appreciated that either or both of these adjustments can facilitate setting the apparatus to accommodate nuts of virtually all sizes.

In the case of certain species of nuts, for example, pecans, it has been found that these nuts can be aligned with their major axis 92 situated perpendicular to the path of travel of the nuts as they are carried towards the transfer zone 106. This alignment provides a highly satisfactory result and is facilitated by vibrating slightly the receptacles 90 which carry the nuts. In addition, it has been found advantageous to vibrate or agitate slightly the hopper 20 to "fluidize" the uncracked nuts placed therein. That is, with the uncracked nuts in a state of agitation, an empty receptacle 90 passing from the apogee at 130 to the perigee at 120 of its travel will more easily enter the collection of uncracked nuts situated in the hopper and will more satisfactorily encourage a nut 22 lifted by the receptacle to assume an equilibrium position on the receptacle which places the major axis 92 of the uncracked nut transverse the path of travel of the receptacle.

To facilitate the stable alignment of an elongate nut such as, say, a pecan, in the receptacle, it is preferred that opposed upstanding flange portions be affixed to or fashioned from each receptacle. Examples of suitable receptacles for use in connection with the apparatus depicted in FIG. 1 are shown in FIGS. 7–9.

In FIG. 7, there can be seen a receptacle 132 suitable for use with species of nuts such as pecans. This receptacle 132 has a flat base portion 134 and an outwardly angled front 136 portion. A back wall portion 138. In preferred form the plane of the front wall 136 slopes at an obtuse angle in relation to the base 134, and the plane of the back wall 138 is perpendicular to the base 134. This arrangement facilitates removal of the nut 22 from the receptacle as a result of the engagement of the crushing surfaces 110.

A pair of opposed, upstanding flanges 140 extend along the side edges of the front wall 136, base 134 and back wall 138. It has been found that this flange 140 facilitates support of an elongate nut in an equilibrium position, that is, with its major axis 92 arranged to provide substantially simultaneously contact of the ends 126 and 128 of the nut and the crushing surfaces of the crushing discs as shown in FIG. 3. If a nut is not properly aligned in the receptacle 90 as the nut enters the transfer zone 107, the first crushing surface 110 which contacts the nut will urge the nut into an equilibrium or aligned condition. This self-aligning feature provides improved flexibility of operation over known devices.

FIG. 8 depicts a substantially V-shaped receptacle 142 having a front wall 144 and a back wall 146. A pair of opposed, upstanding flanges 140 are affixed to or fashioned from the sides of the front wall and back wall as illustrated.

In FIG. 9 there is shown a substantially semi-cylindrical receptacle 148 having a pair of opposed, upstanding flanges 140 affixed to or fashioned from the side walls of the base 150 thereof.

Each of the receptacles shown in FIGS. 7-9 may be affixed through any convenient means to the transport chain 88 in the apparatus of FIG. 1.

Utilizing the present nut cracking apparatus for cracking certain species of nuts, as pecans for example, gives rise to the need for a nut-receiving receptacle capable of holding and aligning a very large nut. Although the receptacles described above with respect to FIGS. 7-9 are suitable for use with species of nuts such as pecans, some classification of nuts is required to cull out the oversized nuts. Although the nut receptacles described with respect to FIGS. 7-9 may be enlarged in size so as to retain an oversized pecan, this over-sized structure would not be practical for use with the nut cracking apparatus described hereinabove since it is necessary for the nut receiving receptacle to pass through an opening between crushing surfaces 110.

Thus, the preferred embodiment for nut-receiving receptacles for oversized uncracked nuts is a collapsible nut-receiving receptacle such as those illustrated in FIGS. 11-15. In each of the FIGS. 11-15 two views are shown, a side view and a top view. Each of the collapsible nut-receiving receptacles 250 will support and align an oversized uncracked nut 22 and still be capable of passing through the opening between crushing surfaces 110.

Figure 11:
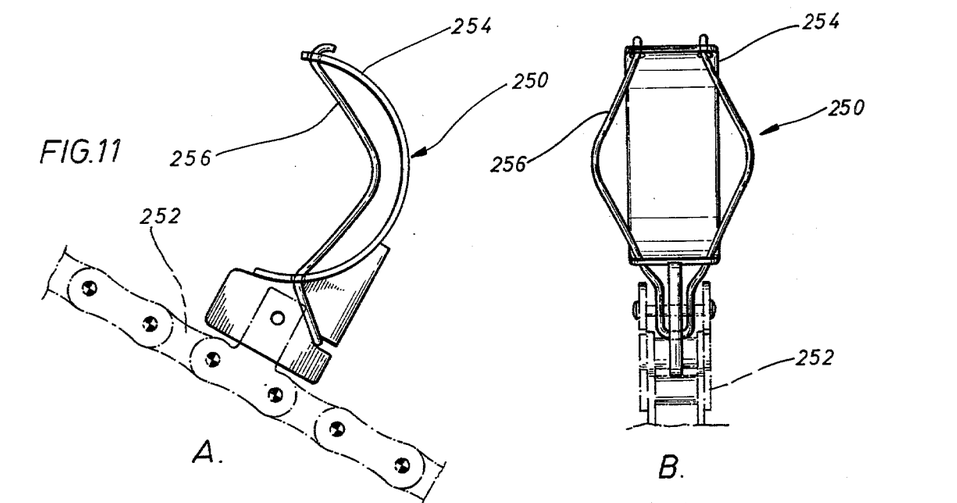
FIGS. 11-15 illustrate side and top views of various collapsible nut-receiving receptacles which may be utilized in conjunction with the transport apparatus of the present invention.

FIGS. 11A and 11B illustrates a semispherical nut-receiving receptacle 250. The semi-spherical receptacle 250 has a suitable means for attaching to a transport mechanism 252 as does each of the receptacles 250 shown in the FIGS. 11-15. The semi-spherical receptacle 250 comprises a semi-spherical support member 254 having a spring wire 256 attached thereto. The spring wire 256 is located on said support member so as to have a first and second position. As shown in the top view of FIG. 11B the first position provides for the spring wire 256 to extend outwardly from the support body 254. This position enables the nut-receiving receptable to hold an oversized nut. However, as the nut-receiving receptacle is transported through the opening defined by the crushing surfaces 110 the spring wire is forced by the crushing surfaces 110 to a second position within the boundaries of the nut-receiving support member 254. The spring wire 256 provides a resilient alignment mechanism for holding a oversized nut and aligning its major axis so as to be perpendicular to the transfer path designated by a transport chain 88 as shown in FIG. 1. Further, the spring wire 256 may be rigidly attached to the transport member 254.

Figure 12:
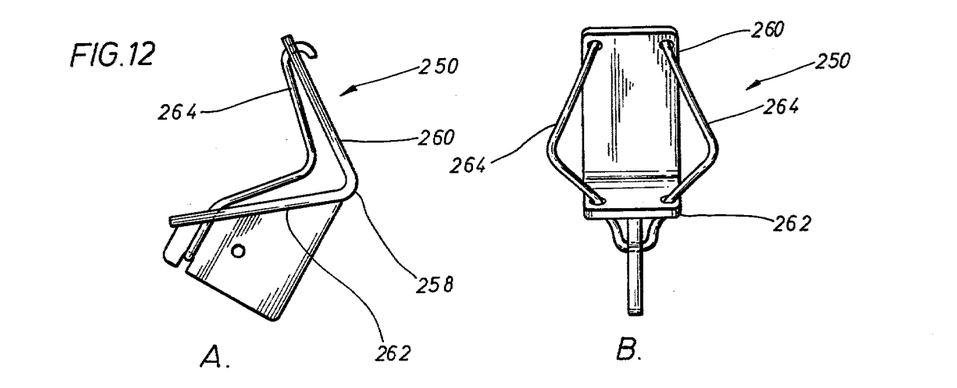
Figure 13:
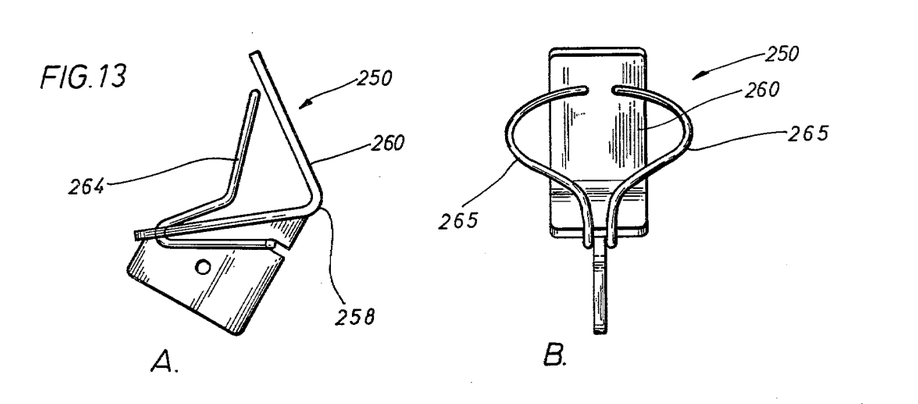

FIGS. 12 and 13 illustrate a second embodiment of the collapsible nut-receiving receptacle 250. The nut-receiving receptacles 250 comprise a concave support member 258 substantially V-shaped and having a front and rear wall 260 and 262 respectively. A collapsible alignment mechanism is provided in each of the structures in FIGS. 12 and 13. The collapsable alignment mechanism 264 in FIGS. 12 and 265 in FIG. 13 comprises spring steel wire. The spring steel wire 264 in FIG. 12 is rigidly attached to the support member 258 at both the front wall and rear wall 260 and 262 respectively. However, the spring steel wire 265 shown in FIG. 13 is rigidly attached only to rear wall 262, providing for a greater resiliency when passing through the crushing discs 110.

Figure 14:
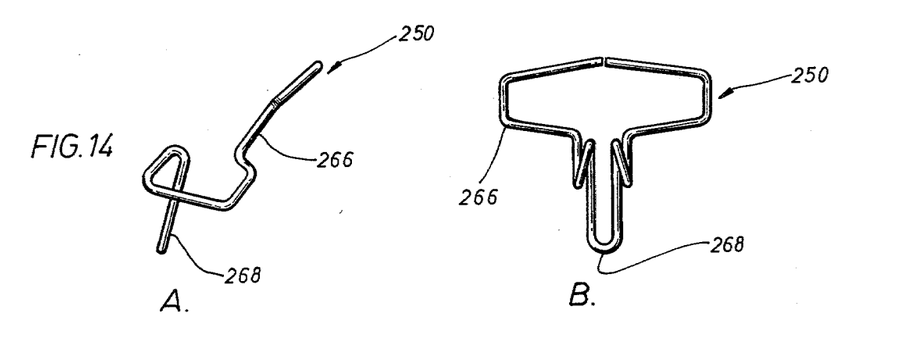

FIG. 14 depicts a collapsible nut-receiving receptacle 250 made entirely from a spring steel wire 266. The spring steel wire 266 is configured in an open loop manner so that the closed loop portion 268 may be attached to a transport mechanism such as the transport chain 88 shown in FIG. 1. Spring wire 266 extends from the attaching the loop 268 in a general rectangular form to support an oversized uncracked nut.

Figure 15:
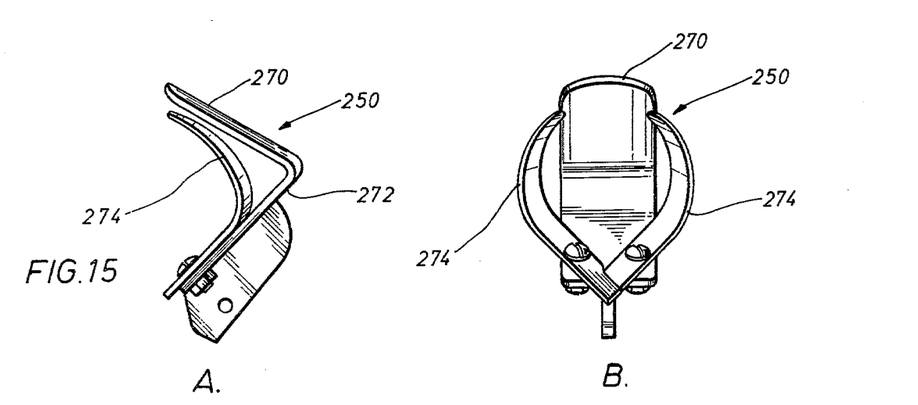

FIG. 15 depicts a collapsable nut-receiving receptacle 250 having a support body similar to those shown in FIGS. 12 and 13 with a front wall 270 and a back wall 272. Two elongated flat steel members 274 are moveably attached to the rear wall 272 of receptacle 250. Elongated members 274 are shown in a first position in FIG. 15B, extending beyond the outward bounds of support member 270. The elongated members 274 in the first position are capable of holding an oversized uncracked nut and delivering the nut to the crushing discs 34 and 36 and further collapsing to a second position within the boundaries of said support member 270 when moving through the opening defined by crushing surfaces 110.

Figure 10:
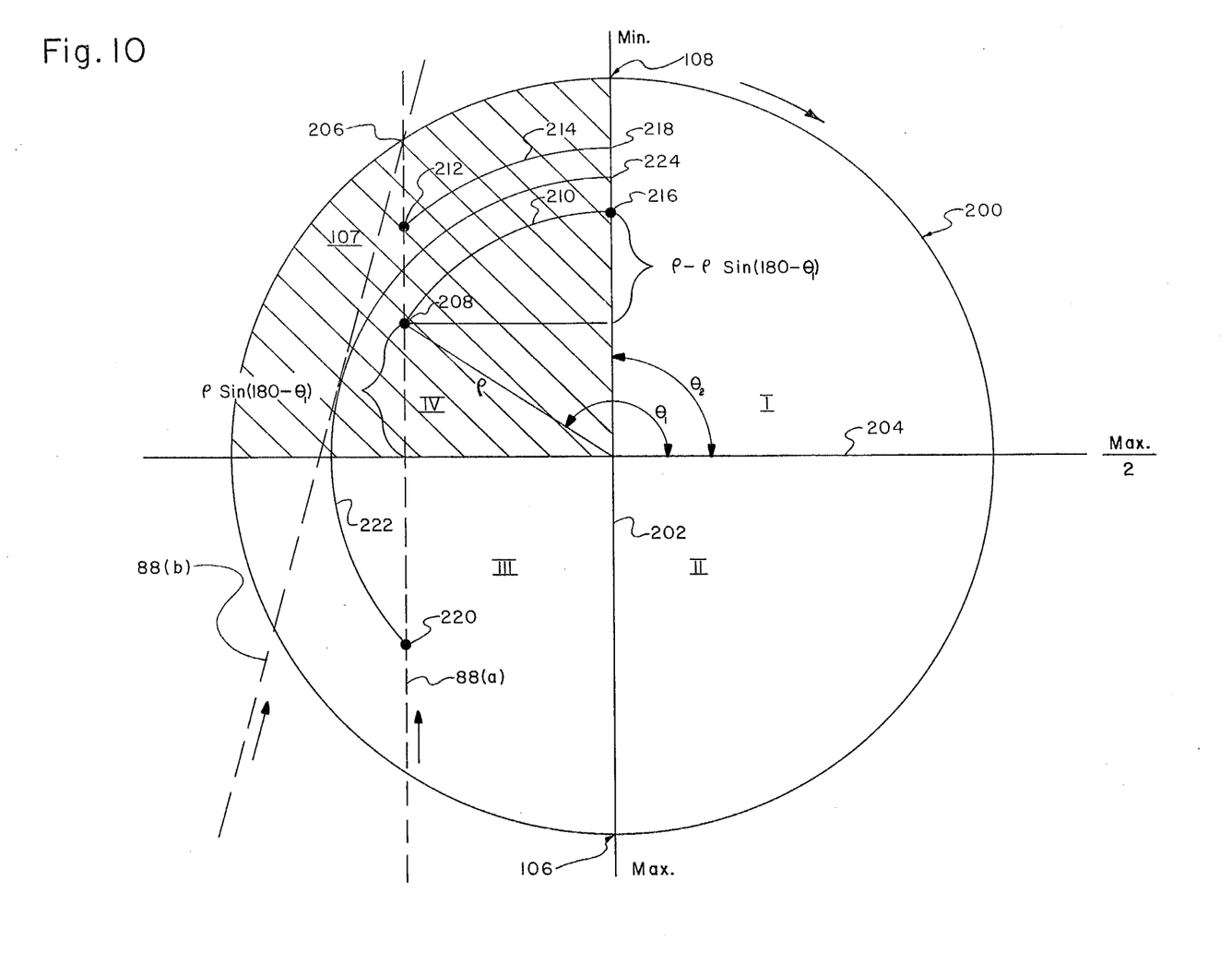
FIG. 10 is a projection of the crushing discs of FIG. 3 onto a plane equidistant from the facing surfaces of the discs.

The point 124 at which the transport chain 88 enters the space between the discs significantly affects the satisfactory operation of the apparatus depicted in connection with FIGS. 1-3. In FIG. 10 there is depicted a projection 200 of the crushing discs 34 and 35 onto a plane equidistant from the respective crushing surfaces 110 of the discs. It will be appreciated that inasmuch as the discs are on axes which are angularly offset, a projection of both of the duscs will be slightly eliptical. However, for illustration purposes the elipse would have major and minor axes which varied so slightly that the projection is nearly circular.

It has been found that the apparatus performs most satisfactorily when the nuts 22 which are placed in the hopper have a length less than half the distance between the discs at the maximum separation zone 106. If nuts having the appropriate range of sizes are introduced into the hopper 20, the duration of the crushing forces imposed by the crushing discs is proporational to the size of the nut in accordance with the following.

The projection of the discs may be orthogonally bisected as shown in FIG. 10. A diagonal (or minor axes) 202 extends from the minimum separation zone 108 to the maximum separation zone 106. This diagonal may be called a "min-max line". Orthogonal to the min-max line is a locus 204 of points representing a separation of the discs by an amount equal to one-half the maximum separation of the disc. This locus may be represented by a diagonal (or major axes) 204 and may be called a "max/2 line".

The orthogonal division of the projection of the discs results in four quadrants, namely I, II, III and IV. The apparatus of the present invention performs most satisfactorily when the transport chain 88 is positioned with respect to the crushing discs to limit the transfer zone to quadrant IV. That is, transport chain 88(a) may be positioned parallel to the min-max line as shown in FIG. 10. Having been so positioned, and with nuts no longer than max/2 in the hopper 20, it will be appreciated that a nut may be wedged between the discs 34 and 35 only in quadrant IV. That is, while in quadrant III, the nut would not extend to the opposed crushing surfaces 110.

Quadrant IV can accommodate nuts ranging in size from max/2 in length to the length of the space between the discs at the exit point 206 of the transport chain 88(a). It will be appreciated that a relatively large nut 208 is engaged in quadrant IV or transfer zone 107 relatively near the max/2 line 204. Having been engaged by the opposed crushing surfaces 110, the relatively large nut 208 will be carried by the crushing discs along an arcuate path 210 towards the min-max line 202. While the relatively large nut 208 travels along its arcuate path, the separation between the crushing discs 34 and 36 is being reduced to impose an axial crushing force on the relatively large nut. Once the relatively large nut has crossed the min-max line 202, the crushing discs begin to diverge relieving the axial crushing forces.

Similarly, a relatively small nut 212 will be carried upwardly by transport chain 88(a) to a location nearer the minimum separation zone 108. The relatively small nut 212 is engaged by the opposed crushing surfaces of the crushing discs at a location of relatively small separation between those discs, and the relatively small nut is carried along an arcuate path towards the min-max line during which time axial crushing forces are imposed by the crushing discs. Thus, it can be seen that axial crushing forces are imposed on a nut until the nut crosses the min-max line. Ther relatively large nut will cross the min-max line at a point 216 where the crushing discs have a relatively large separation; correspondingly, the relatively small nut will cross the min-max line at a location 218 where the discs have a relatively small separation. With this arrangement, axial crushing forces imposed on a nut will be proportional to the size of the nut. However, this desirable result is limited to quadrant IV. That is, if an extra large nut 220 were to be conveyed to a location in quadrant III and there be engaged by the crushing discs, that extra large nut 220 would be conveyed by the crushing discs along a relatively long arcuate path 22, and the extra large nut would intersect the min-max line at 224 relatively near the minimum separation zone 108. This would probably result in an excess duration and amount of axial crushing force being imposed on the extra large nut with the result that the meat of the nut would be crushed into undesirably small pieces. However, large nuts which are transferred from the transport chain 88(a) in quadrant IV have a relatively short arcuate path to travel and cross the min-max line at a point closer to the max/2 line 204.

It will be appreciated that transport chains may be variously positioned relative to the crushing discs to transport nuts into the transfer zone 107. Inasmuch as the duration and extent of the axial crushing forces is functionally related to the length of arcuate travel which a nut experiences while carried by the crushing discs, a transport chain positioned in a manner depicted at 88(b) would provide greater arcuate travel for relatively large nuts and lesser travel for relatively small nuts. Such an arrangement might be desirable in applications where larger varieties of a particular species of nut required relatively greater crushing forces. Conversely, a transport chain could be positioned with respect to the crushing discs in such a manner that the relatively small nuts experience a relatively long arcuate travel and relatively large nuts experience a relatively short arcuate travel. Such an arrangement might be desirable when utilizing the apparatus of the present invention to crack species of nuts who smaller sizes require greater crushing forces than do the large sizes. In any event, it will be appreciated that the apparatus of the present invention provides controlled proportioned crushing forces in relation to the size of the nut being cracked.

The relationship of the adjustable or variable features of the apparatus of FIGS. 1–3 may be expressed mathematically to facilitate optimum utility from the present invention. Referring to FIG. 10, the pick-up point 208 may be expressed in polar coordinates $(\rho, \theta_1)$ where $\rho$ is the radius vector of the nut 208 and is constant, and $\theta_1$ is the vestorial angle which changes as the nut 208 is carried by the crushing discs toward the min-max line 202. The point 216 of minimum disc separation for the arc traveled by the nut 208 may be expressed in polar coordinates $(\rho, \theta_2)$.

The length "s" of the arc of travel 210 can be expressed as follows:

$$s = \int_{\theta_2}^{\theta_1} \sqrt{\rho^2 + \left(\frac{d\rho}{d\theta}\right)^2}\, d\theta$$

The length of arc s can also be expressed as $s = \rho \theta_{(r)}$ where $\rho$ is the radius vector of the nut 208, and $$\theta_{(r)} = \frac{(\theta_1 - \theta_2)\pi}{180}$$

which is the angle of travel expressed in radians.

The amount the length of the nut 20 is reduced or shortened by the crushing discs may be expressed in terms of the radius vector $\rho$ of the nut and the angle $\Gamma$ between the crushing discs along the min-max line 202. It is believed that the reduction in length may be expressed as follows:

$$2\rho \operatorname{Tan} \frac{\beta}{2} [1 - \operatorname{Sin}(180 - \theta_1)]$$

With reference not to the apparatus of FIG. 4, it will be seen that an alternative embodiment 152 is depicted with respect to the apparatus for transporting a nut 22 from a hopper 154 to the transfer zone of the crushing discs. In the embodiment of FIG. 4, a transport wheel 156 is utilized which has a series of receptacles 90 positioned along the circumference 158 thereof. As the transport wheel rotates in the counterclockwise direction, the crushing discs 34 and 36 rotate together in the clockwise direction and at a slightly greater angular speed. With this arrangement, a nut which is urged against the crushing surfaces 110 in the transfer zone 107 will be lifted out from the receptacle 90 which transported it thereto, and the nut will be clear of the path of travel of the empty receptacle.

As in the case of the crushing discs 34 and 36 in the embodiment of FIG. 1, the crushing disc in FIG. 4 may be adjusted along their respective shafts to alter the geometry of the transfer zone 107.

The hopper 154 of the apparatus of FIG. 4 has a curved bottom wall 160 which has substantially the same radius of curvature as the transport wheel 156. This facilitates the pick-up of an uncracked nut 22 from the hopper. Both the hopper 154 and the transport wheel 156 may be vibrated or agitated as described above in connection with the apparatus of FIGS. 1 and 2 to facilitate pick-up of uncracked nuts.

The hopper 154 and a chute 162 of the apparatus of FIG. 4 may be integrally formed to minimize the loose pieces of shell and nut meat which fall to the floor in the vicinity of the apparatus.

The transport wheel 156 may be adapted to carry any of the receptacles illustrated in FIGS. 7-9 about the circumference 158 thereof.

It will be appreciated that the transport mechanism, whether chain, belt or wheel, and the pair of opposed crushing discs may be driven through a single drive motor or manual crank with appropriate gears or pulleys to provide for a speed of rotation of the discs 34 and 36 which increases the speed of the uncracked nut 22 which is wedged in the transfer zone 107 at the instant of transfer. That is, the angular velocity of the crushing discs should be slightly in excess of the linear velocity of the transport chain 88 in the apparatus of FIG. 1 or should be slightly greater than the angular velocity of the transport wheel 156 of the apparatus of FIG. 4. Moreover, the diameter and axis of the transport wheel 156 may be varied to achieve desired proportional cracking in the transfer zone 107 in relation to the size of the nut.

Figures 5, 6:
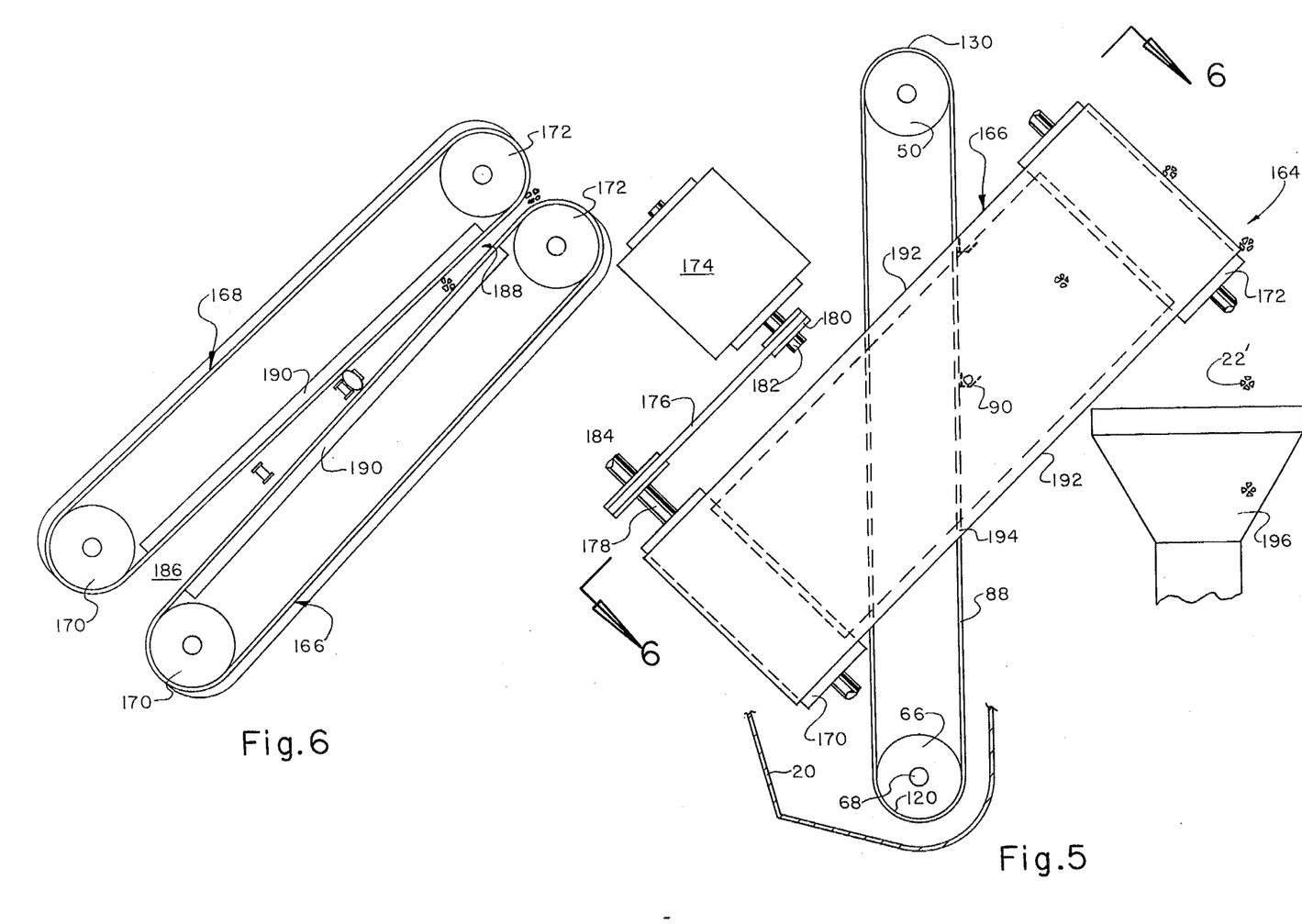
FIG. 5 is a partial sectional view of an alternative embodiment of the apparatus of the present invention.
FIG. 6 is a partial sectional view taken along section lines 6—6 of FIG. 5.

With reference now to FIGS. 5 and 6, there is illustrated an alternative embodiment 164 of the method and apparatus of the present invention. A bin 20 is provided to receive a supply of uncracked nuts 22. Positioned within the hopper 20 is a drive sprocket 66 mounted on a drive sprocket shaft 68. This drive sprocket shaft is carried by a pair of conventional bearings positioned outside the hopper substantially similar to the arrangement depicted in conjunction with FIGS. 1 and 2. A transport chain or belt 88 extends around the drive sprocket 66 and an idler sprocket 50 spaced apart from the drive sprocket. The transport chain or belt 88 carries a series of receptacles 90 which are attached to the transport chain through any suitable means.

The drive sprocket 66 and the idler sprocket 50 are positioned in such a manner that the transport chain 88 passes between a pair of conveyor belts 166 and 168. These conveyor belts 166 and 168 each extend over a first 170 and second 172 conveyor belt roller. This first 170 of these rollers may be driven by a conveyor belt drive motor 174 which may be coupled with a belt 176 to a shaft 178 of the first roller. A pulley 180 is affixed to a drive motor shaft 182, and a pulley 184 is affixed to the drive roller shaft 178.

Inasmuch as it is desirable to synchronize the conveyor belts, it will be appreciated that the rollers 170 and 172 for each conveyor belt 166 and 168 are of the same diamter and the conveyor belts are of the same length. With this arrangement it is possible to utilize a single drive motor to simultaneously drive both conveyor belts through well-known means (not illustrated).

The conveyor belts 166 and 168 are arranged as depicted in FIG. 6 with one corner of the conveyor belts defining a zone 186 of maximum separation zone 106 of the crushing discs 34 and 36 illustrated in FIG. 3. An opposite corner of the conveyor belts defines a zone 188 of minimum separation which corresponds to the minimum separation zone 108 of the discs illustrated in FIG. 3. The conveyor belts are arranged so that the respective belts are relatively angled in two respects. The belts are generally convergent at one end and generally divergent at another end. In addition, each end has a generally convergent corner and a generally divergent corner.

Positioned behind each conveyor belt is a backing plate 190 which is rigidly affixed to a frame (not shown). The backing plate 190 as shown in phantom in FIG. 5 extends almost to the side edges 192 of the conveyor belts and along substantially the entire length of the conveyor belts.

In operation, an uncracked nut 22 is lifted by a receptacle 90 from the hopper 20. The nut is transported towards the apogee at 130 of the path of the receptacle and enters the conveyor belt interspace at a point 194 of relatively wide separation of the conveyor belts 166 and 168. As the uncracked nut continues along its path of travel, the ends of the nut will come into contact with the conveyor belts. The continued movement of the receptacle 90 will tend to wedge the nut between the conveyor belts. Relatively large nuts will be transferred to the conveyor belts at locations relatively near the maximum separation zone and vice versa.

The conveyor belts translate in synchronization as a result of motivation by the conveyor belt motor 174. The speed of drive of the conveyor belts is such that when a nut is wedged between the conveyor belts as a result of the relatively upward motion of the receptacle 90, the nut 22 is effectively removed from the receptacle and transferred to the conveyor belts. That is, the slightly resilient conveyor belts frictionally engage the nut, and because the conveyor belts are translating in synchronization at the same linear speed, the nut is transported towards the conveyor belt crushing zone 188 as shown in FIG. 6. However, the distance between the conveyor belts which hold the nut is gradually reduced as the conveyor belts carry the nut toward the minimum separation zone 188. At some point in the travel of the nut, the pressure applied axially to the nut by the backing plates 190 will shatter the shell of the nut and the loose pieces will gravitate into a chute 196 which directs the pieces 22' to a location where the meats can be separated from the cracked shell. If a nut is too small to contact the conveyor belt surfaces as the transport chain or carrier 188 advances the receptacle 90 through the conveyor belt interspace, the nut will ride the receptacle through the apogee at 130 of the receptacle and fall once again into the hopper 20.

The rollers 172 are not on parallel axes but rather are angulated towards each other at the corner of minimum separation. Because of both the "incline" and the "tilt" of the conveyor belt, a relatively large nut which is transferred to the belt ultimately will be carried by the conveyor belts to a location having greater separation than the separation between the conveyor belts at the minimum separation zone. Similarly, the relatively small nuts ultimately will be carried by the conveyor belts to a location having less separation than the separation for relatively larger nuts.

If nuts of, say, a relatively small size are introduced into the hopper 20, adjustments may be made in two respects to facilitate satisfactory cracking of the smaller nuts. Firstly, the conveyor belts 166 and 168 may be moved towards each other through conventional means (not shown). Secondly, or alternatively, the idler sprocket 50 may be repositioned in a manner similar to that depicted in connection with the apparatus of FIG. 1. Either or both of these adjustments can facilitate setting the apparatus to accommodate nuts of all sizes.

The hopper and transport mechanism may be vibrated slightly not only to facilitate nut pick-up as the receptacle passes through its perigee at 120, but also to facilitate alignment of the uncracked nut to align the major axis 192 of the uncracked nut perpendicular to the path of travel of the nut as the nut travels toward the transfer zone 186.

Round nuts or nuts not having a major axis will also be satisfactorily cracked with the method and apparatus of the present invention. So long as the shell of the uncracked nut extends beyond the edges of the receptacles, the nuts will engage the crushing surfaces of the crushing discs or the conveyor belt and be transferred into a crushing zone.

SUMMARY OF ADVANTAGES AND SCOPE OF THE INVENTION

It will be appreciated that in constructing a nut cracking apparatus according to the invention and in practicing the method thereof, certain significant advantages are provided.

In particular, nuts cracked in accordance with the teachings of this invention will yield relatively unshattered nut meats. It has been found that axial crushing forces are most satisfactory for shattering the shell of a nut while leaving the meats relatively unharmed. There are not substantial radial forces being imposed against the shell of the nut, and thus there results a more satisfactory cracking of the shell.

Of independent significance is the speed with which the apparatus of the present invention may be operated. It is believed that in the order of 600 nuts per minute may be cracked with the apparatus of the invention, which provides significant advantages over prior art devices. The self-aligning feature of the present invention does not require that the nut be manually oriented prior to cracking.

Another advantage of the present invention is that the apparatus does not require a hammering or other abrupt changes of momentum which characterize many known devices. The cracking of nuts is performed by the present invention in a relatively smooth and quiet operation. Moreover, the apparatus may be arranged to provide proportional cracking in relation to the size of the nut. That is, all nuts fed to the apparatus can experience proportionately the same duration and amount of crushing forces.

The foregoing description of the invention has been directed to several preferred embodiments in accordance with the requirements of the patent statutes and for purposes of explanation and illustration. It will be apparent, however, to those skilled in this art that many modifications and changes in both apparatus and method may be made without departing from the scope and spirit of the invention. For example, the crushing discs may be made from materials such as wood or specially coated steel. In addition, the apparatus may be operated manually or with various devices to provide a range of variable speeds of the transport mechanism and of the crushing mechanism. Also, it will be further apparent that the invention may be utilized, the suitable modifications within the state of the art, to crack larger fruits, such as coconuts, and the like. In addition, the transport mechanism may introduce the uncracked nut from a location other than below the level of the crushing mechanism. That is, uncracked nuts may be fed utilizing gravity from a location above the crushing mechanism. With suitable modifications, it may be operated from a single source of power, for example, a single motor may be used to operated any of the embodiments disclosed. These, and other modifications of the invention will be apparent to those skilled in this art. It is the Applicant's intention in the following claims to cover all such equivalent modifications and variations as fall within the true spirit and scope of the invention.

What is claimed is:

1. A nut cracking apparatus comprising:
   a hopper for storing a supply of uncracked nuts;
   a cracking means for separating the shell from the meat of said uncracked nuts including a pair of opposed discs, rotating at the same speed about different axes, such that said discs are in adjustable angular offset relationship to one another;
   transport means located between and operatively associated with said hopper and said cracking means for delivering said uncracked nuts to a first location between said opposed discs where said uncracked nuts are wedged therebetween by said transport means and then displaced arcuately to a second location by the rotational movement of said opposed discs for cracking with a cracking force proportional to the size of said uncracked nuts; and
   collapsible nut-receiving receptacles located on said transport means for supporting said uncracked nuts while being delivered between said cracking means, said collapsible nut-receiving receptacles having a first position and second position constricted from said first such that said receptacles collapse from a first to a second position while moving through said pair of opposed discs.

2. A nut cracking apparatus as set forth in claim 1 wherein said collapsible nut-receiving receptacles comprise a support member and resilient alignment means disposed on said support member for aligning and orienting a major axis of said uncracked nut in a direction perpendicular to the path of travel of said uncracked nut.

3. The apparatus of claim 2 wherein said support member comprises a generally concave body.

4. The apparatus of claim 2 wherein said resilient alignment means comprises a steel spring wire connected to said support member and having a first and second position such that said first position locates said spring wire outside the confines of said support member and said second position locates said spring wire within the confines of said support member.

5. The apparatus of claim 2 wherein said resilient alignment means comprises a pair of elongated flat spring steel members with each member equal to one-half the width of said support member and moveably attached to said support member.

6. A nut cracking apparatus as set forth in claim 1 wherein said collapsible nut-receiving receptacles comprise a spring wire having a generally oblong configuration that is moveable from a first larger oblong configuration to a second smaller oblong configuration.

7. The apparatus of claim 1 wherein said transport means comprises a rotating means having a plurality of collapsible nut-receiving receptacles attached thereto and moveable therewith.

8. A nut cracking apparatus as set forth in claim 1 further including vibration-inducing means operatively associated with said hopper for vibrating said uncracked nuts disposed in said hopper.

9. A nut cracking apparatus comprising:
a hopper for storing a supply of uncracked nuts;
cracking means for separating the shell from the meat of said uncracked nuts including a pair of opposed discs, rotating at the same speed about different axes, such that said discs are in adjustable angular offset relationship to one another;
transport means located between and operatively associated with said hopper and said cracking means for delivering said uncracked nuts to a first location between said opposed discs where said uncracked nuts are wedged therebetween by said transport means and then displaced arcuately to a second location by the rotational movement of said opposed discs, for cracking with a cracking force proportional to the size of uncracked nuts, and said opposed discs having an angular relationship to provide a minimum and maximum separation distance therebetween.

10. A nut cracking apparatus as set forth in claim 9 further including an adjusting means connected to said pair of opposed discs and operatively associated therewith for adjusting the angular offset between said opposed discs, thus enabling the altering of said minimum and maximum separation distances to allow for fluctuation in said uncracked nut size.

11. A nut cracking apparatus as set forth in claim 10 wherein said adjusting means comprises a set screw connected to said opposed discs.

12. A nut cracking apparatus as set forth in claim 10 wherein said distance separation of said opposed discs at said first location is equal to or less than one-half of said maximum separation distance to provide a proportional cracking force on said uncracked nuts as they are transported to said second location toward said minimum separation distance.

13. A nut cracking apparatus as set forth in claim 1 wherein said opposed discs are planar.

14. A nut cracking apparatus as set forth in claim 9 further including collapsible nut-receiving receptacles located on said transport means for supporting said uncracked nuts while being delivered between said cracking means, said collapsible nut-receiving receptacles having a first position and second position constricted from said first position such that said receptacles collapse from a first to a second position while moving through said pair of opposed discs.

* * * * *

UNITED STATES PATENT AND TRADEMARK OFFICE
CERTIFICATE OF CORRECTION

PATENT NO. : 4,201,126
DATED : May 6, 1980
INVENTOR(S) : Kenneth R. Evans

It is certified that error appears in the above-identified patent and that said Letters Patent are hereby corrected as shown below:

```
Column 2, line 35, delete "stantally" and insert
                --stantially--.
Column 5, line 2, delete "slighly" and insert
                --slightly--.
Column 6, line 25, delete "one" and insert --zone--.
Column 8, line 5, delete "a" and insert--an--.
          line 16, delete "collapsable" and insert
                --collapsible--.
          line 17, delete "Figs" and insert --Fig.--.
          line 33, delete "callapsable" and insert
                --collapsible--.
          line 36, delete "movea-" and insert--mova--.
          line 55, delete "dusc" and insert --discs--.
          line 65, delete "proporational" and insert
                --proportional--.
Column 9, line 48, delete "Ther" and insert --The--.
Column 10, line 53, delete "20" and insert --208--.
          line 55, delete "angle T: and insert
                --angle B--.
Column 12, line 4, delete --diamter-- and insert
                "diameter".
Column 14, line 18, delete "operated" and insert
                --operate--.
```

UNITED STATES PATENT AND TRADEMARK OFFICE
CERTIFICATE OF CORRECTION

PATENT NO. : 4,201,126
DATED : May 6, 1980
INVENTOR(S) : Kenneth R. Evans

It is certified that error appears in the above—identified patent and that said Letters Patent is hereby corrected as shown below:

Column 15, line 9, delete "means" and insert -- member --.

Signed and Sealed this

Twenty-eighth Day of October 1980

[SEAL]

Attest:

SIDNEY A. DIAMOND

Attesting Officer

Commissioner of Patents and Trademarks